Patented Feb. 27, 1940

2,192,140

UNITED STATES PATENT OFFICE 2,192,140

DEVICE FOR TRANSFERRING LIQUIDS IN VACUUM

Harold J. McCreary, Genoa, Ill., assignor to Chicago Television & Research Laboratories, Inc., a corporation of Illinois Original application September 20, 1935, Serial No. 41,366. Divided and this application July 31, 1937, Serial No. 156,656

2 Claims. (Cl. 23—259)

The invention relates to a process for purifying dielectrics and is a division of my application filed September 20, 1935, under Serial #41,366.

It is an object of the invention to provide a novel device for transferring a liquid under vacuum from one vacuum system to another.

A further object aims at trapping the liquid into a vessel having a capillary and connected to a vacuum system, sealing off the vessel, resealing the vessel to a second vacuum system and breaking off the capillary under exclusion of air.

A further object aims at providing means in the second vacuum system but actuable from without, to establish communication between the vessel and the second vacuum system.

Figure 1:
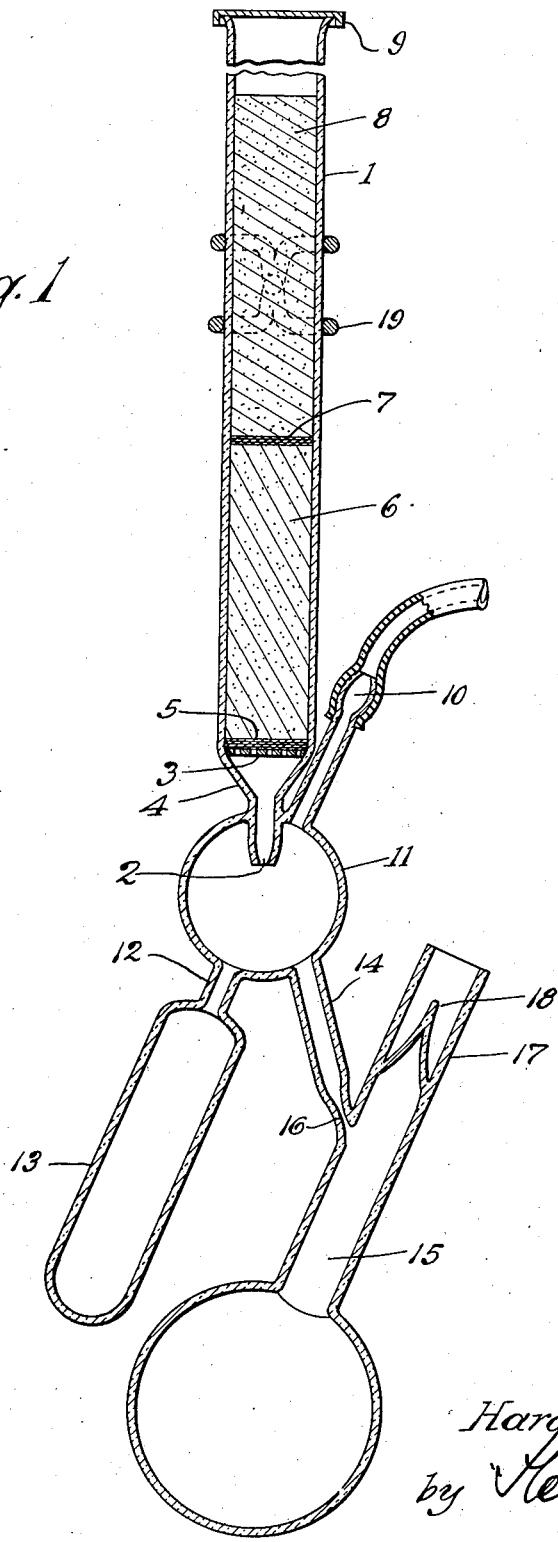
Figure 2:
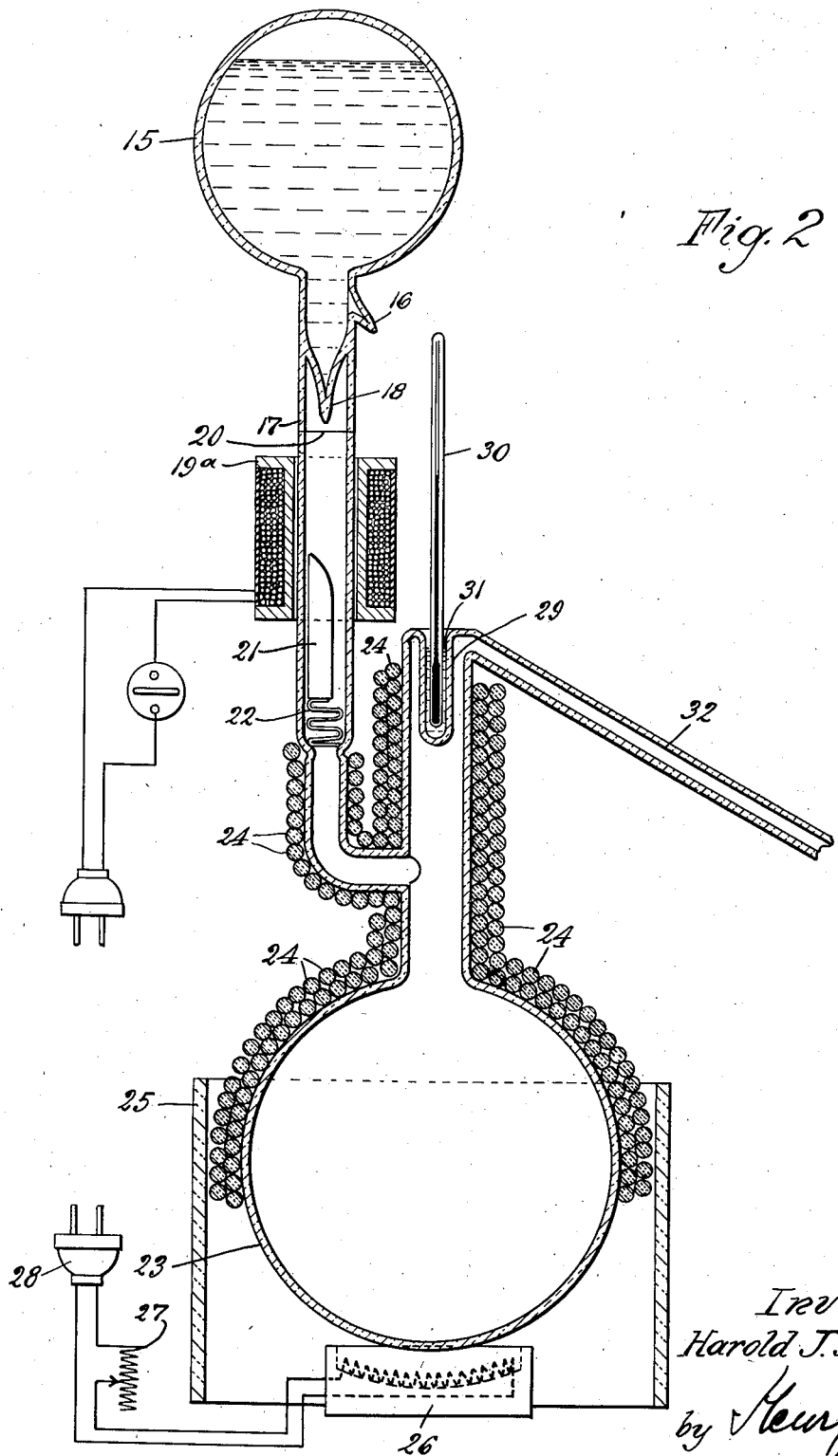

Other equally important objects will become apparent from a perusal of the application comprising the specification, which sets forth the means and the steps of the process employed in the invention, and from the claims which particularly point out the novel features of the invention. The means for carrying out the process constituting the invention is illustrated in the accompanying drawings, in which Figs. 1 and 2 illustrate the apparatus used in carrying out my invention.

Referring to the drawings, 1 is a Pyrex glass tube approximately 1" in diameter and 3 ft. long, sealed at one end to a smaller tube 2 which is approximately ⅜" in diameter, and 3" long. Tubes 1 and 2 comprise the filtering column. A porcelain straining disc 3 is installed with a loose fit into the tube 1 and rests on the constricted portion 4 of the glass tube 1. Five discs of filter paper 5 are rammed down on top of the porcelain strainer 3 by means of a glass tube (not shown) slightly smaller than the tube 1. The filter paper discs are about ⅛" larger than the inside bore of tube 1, and are pushed into place one at a time. By this process the proper grade of strainer is installed in tube 1.

Commercially pure calcium oxide 6 is finely powdered with a mortar and pestle and is then placed on top of the filter paper discs 5. The calcium oxide 6 is packed down with a glass rod (not shown) so that it forms a column approximately six inches deep in the tube 1. On top of this column of calcium oxide two discs of filter paper 7, exactly of the same type as filter paper 5, are rammed into place.

A column approximately 10" long of tightly packed commercially pure anhydrous sodium sulphate 8 is then placed on top of the filter paper discs 7. The sodium sulphate has been very finely powdered before using. The remainder of tube 1 is now filled with the nitrobenzene to be purified and a loose fitting cover 9 is placed on top of the glass tube 1 to keep dust and other impurities out.

The filtering column 1 is connected by means of a small tube 2 to the glass bulb 11 which, in turn, is connected by a tube 12 to a residual container 13 and by a tube 14 to a special flask 15 through a seal-off constriction 16. The glass bulb 11 is also connected by tube 10 to an oil vacuum pump (not shown). The flask 15 is special in that it has in its neck 17 a capillary 18 so that it can be opened in a vacuum in a manner well known in the art of handling rare gases.

Attention is called to the fact that the filtering column at the top has less vacuum than at the bottom, so that as the liquid descends it is subjected to a progressively increasing vacuum.

The entire glass structure comprising filtration column 1, bulb 11, residual container 13, and special flask 15, are all welded into a continuous vacuum-tight envelope and mounted with clamps on a tilting structure pivoted so that the envelope may be tilted so that either tube 12 or tube 14 may be filled with processed nitrobenzene from the tube 2 of the filtering column.

The glass structure of Fig. 1 is tilted on its pivot so that the aperture of tube 2 is directly over the aperture of tube 12. The oil vacuum pump connected to tube 10 with a rubber hose is started and the nitrobenzene which has been poured into the top of filtration column 1 will seep down the filtration column until it drips from the aperture of tube 2 into tube 12 and into the residual container 13.

After a few teaspoonsful have dripped into the container 13, the glass structure is tilted about its pivot in such a manner that the nitrobenzene from tube 2 will drip into tube 14 and run down into the special flask 15. The top of the filtration column is always kept full of nitrobenzene and is never allowed to get down to the top surface of the sodium sulphate. When the special flask 15 has been filled to within a short distance of the seal-off constriction 16, the glass structure is tilted on its pivot until the nitrobenzene again drips into tube 12. The seal-off constriction 16 is then warmed to vaporize the nitrobenzene on the inner surface, and the special flask 15 is then sealed off.

The special flask 15, which has been sealed off full of nitrobenzene, after completion of the operation just described, is inverted as shown in Fig. 2, and the neck 17 is sealed to the tube 20. 19a is a solenoid which is placed over the tube 20 before making the seal between the neck 17 and the tube 20. 21 is an iron slug and 22 is a steel spring placed in a tube 20 before making the seal of tube 17 to tube 20. The solenoid 19a is connected by a cord through a snap switch and connection plug to a 100-volt D. C. source, the switch normally being in the "off" position. It will be observed that the tube 20 leads to a distilling flask 23, which is wrapped with asbestos rope 24 for heat insulation purposes. The flask 23 is also protected from air currents by an asbestos paper cylinder 25 placed at the bottom of the flask. An electrical heater 26 is placed in the bottom of the paper cylinder 25 and is connected to a 110-volt D. C. source through a rheostat 27 and a connection plug 28. At the top of the neck of the distillation flask 24 is a thermometer well 29 of glass and a close sliding fit for the thermometer 30. Mercury 31 is placed in thermometer well 29 to insure good heat conduction. At the top of the neck of the distillation flask is the tube 32, which carries the nitrobenzene vapors to a condensing coil, not shown.

Energy is then connected to the magnet 19a by inserting the energizing plug into a 110-volt D. C. source and operating switch 20. This action will cause iron slug 21 to strike capillary tube 18 and break it. The nitrobenzene will now flow down into the distillation flask 23.

When all of the nitrobenzene is in the flask 23 and the vacuum pumps have restored a good vacuum to the system, the heater 28 is started and adjusted so that it gradually brings the temperature up to about 60 deg. centigrade. Both temperature and pressure should be maintained constantly during the distillation process.

My invention is not limited to the particular arrangement of apparatus as shown in the drawings in carrying out the process, but may be variously modified without departing from the spirit and scope of the invention set forth in the claims which follow, and I, therefore, claim my invention as broadly as the state of the art permits.

I claim:

1. In a device for purifying a dielectric, a vessel containing a dielectric under vacuum, said vessel having a projecting neck with a frangible seal thereacross spaced inwardly of the outer end of the neck, a vacuum system having a tube sealed with the end of the neck of the vessel around the seal and longitudinally aligned with said neck, means mounted in said tube for movement longitudinally thereof into breaking engagement with the seal, and means externally of the tube for actuating said breaking means.

2. In a device for purifying a dielectric, a vessel containing a dielectric under vacuum, said vessel having a projecting neck with a frangible seal thereacross spaced inwardly of the outer end of the neck, a vacuum system having a tube sealed with the end of the neck of the vessel around the seal and longitudinally aligned with said neck, a striker mounted in said tube for movement longitudinally thereof into breaking engagement with the seal, and an electro-magnet surrounding said tube externally thereof for actuating said striker.

HAROLD J. McCREARY.